(12) United States Patent
Ide

(10) Patent No.: US 7,289,915 B2
(45) Date of Patent: Oct. 30, 2007

(54) METHOD OF ESTIMATING LOAD INERTIA FOR A MOTOR

(75) Inventor: Yuuji Ide, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 11/565,031

(22) Filed: Nov. 30, 2006

(65) Prior Publication Data

US 2007/0143040 A1 Jun. 21, 2007

(30) Foreign Application Priority Data

Dec. 2, 2005 (JP) .............................. 2005-349266

(51) Int. Cl.
*G01L 5/00* (2006.01)
(52) U.S. Cl. ..................... 702/41; 702/967; 73/862.27
(58) Field of Classification Search ................. 702/41, 702/96; 73/862.27
See application file for complete search history.

(56) References Cited

U.S. PATENT DOCUMENTS 6,736,018 B2 5/2004 Terada 7,187,148 B2* 3/2007 Okita et al. .................. 318/432
2001/0040439 A1* 11/2001 Kato et al. ................... 318/432

FOREIGN PATENT DOCUMENTS

JP 2000-346738 12/2000

OTHER PUBLICATIONS

"High-performance Control of a Servomotor using a Low Precision Shaft Encoder -Instantaneous Speed Observer and Identification of the Inertia Moment-", Yoichi Hori et al., T.IEE Japan, vol. 114-D, No. 4, '94, pp. 424-431, (English abstract included).

* cited by examiner

*Primary Examiner*—John Barlow
*Assistant Examiner*—Jonathan Moffat
(74) *Attorney, Agent, or Firm*—Rankin, Hill, Porter & Clark LLP

(57) ABSTRACT

A method of estimating load inertia for a motor is provided that can estimate the load inertia even when a cogging torque of the motor is large or resonance occurs in the mechanical system of the load. Vibration is detected in an acceleration feedback signal. An estimated inertia gain $K_n$ is multiplied by a coefficient $\alpha$ of zero (0) or more but less than one (1) when the detected vibration is equal to or more than a predetermined level, or the estimated inertia gain $K_n$ is multiplied by a coefficient $\alpha$ of one (1) when the detected vibration is less than the predetermined level.

6 Claims, 4 Drawing Sheets

METHOD OF ESTIMATING LOAD INERTIA FOR A MOTOR

BACKGROUND OF THE INVENTION

The present invention relates to a method of estimating load inertia for a motor, more specifically a method of estimating load inertia for a servo motor for a robot or a feed shaft of a machine tool.

FIG. 3 is a schematic diagram of a conventional motor speed controller which automatically tunes the motor speed using an estimated load inertia. The controller detects rotation of a motor M with an encoder 3. A speed calculator 4 calculates a motor speed based on an output from the encoder 3. An acceleration speed calculator 5 calculates an acceleration speed based on the calculated motor speed and outputs an acceleration feedback signal. A speed controller 1 outputs a torque command so that a difference between a speed feedback signal outputted from the speed calculator 4 and a speed command signal may be zero (0). A torque controller 2 drives the motor M in accordance with the torque command. An inertia estimator 6 which estimates load inertia of the motor M receives the acceleration feedback signal outputted from the acceleration speed calculator 5 and the torque command signal outputted from the speed controller 1, and estimates the load inertia based on these signals. Then, the inertia estimator 6 outputs an estimated inertia to a gain regulator 7. The gain regulator 7 regulates the gain of the speed controller 1 to an appropriate value, based on the estimated inertia.

FIG. 4 is a schematic diagram of a conventional inertia estimator used in the speed controller of FIG. 3. In actuality, the estimator is configured by software. The method of estimating inertia implemented in the inertia estimator shown in FIG. 3 is described in detail in a journal of the Institute of Electrical Engineers of Japan, titled "High-performance Control of Servomotor using Low Precision Shaft Encoder—Instantaneous Speed Observer and Identification of the Inertia Moment" (vol. 114-D, No. 4, '94, pp. 424-431). According to the technology described in this journal, a moment of inertia, or simply an inertia, is identified as follows: an estimated inertia gain $K_n$ is determined by recursive least squares method based on a torque command from the speed controller and an acceleration feedback signal. According to the configuration shown in FIG. 4, an acceleration feedback difference $\Delta a_n$ is calculated between a value for an acceleration feedback signal which has passed through a low-pass filter LPF and a value for a previous acceleration feedback signal which has passed through the low-pass filter LPF. A previous estimated inertia $J_{n-1}$ is multiplied by the acceleration feedback difference $\Delta a_n$ to obtain a value of $\Delta a_n J_{n-1}$, from which a torque feedback difference $\Delta T_n$ is obtained. Next, a torque command difference $\Delta T_{cn}$ is calculated between a value for a torque command signal which has passed through another low-pass filter LPF and a value for a previous torque command signal which has passed through that low-pass filter LPF. Then, an error $e_n$ is calculated between the torque feedback difference $\Delta T_n$ and the torque command difference $\Delta T_{cn}$, as expressed in $e_n = \Delta T_{cn} - \Delta T_n$. Finally, the error $e_n$ is multiplied by the estimated inertia gain $K_n$ to obtain a value of $e_n K_n$, and the value of $e_n K_n$ is added to a previous estimated inertia value $J_{n-1}$ to obtain an estimated inertia $J_n$. Inertia estimation is recursively implemented in a predetermined sampling interval while the motor is being controlled. The inertia $J_n$ is estimated so that the error $e_n$ may be smaller. The estimated inertia gain $K_n$ is calculated in $K_n = (P_{n-1} \Delta a_n)/(\lambda + P_{n-1} \Delta a_n^2)$, where $P_n$ is a correlation of coefficient error as expressed in $P_n = P_{n-1}/(\lambda + P_{n-1} \Delta a_n^2)$ and $\lambda$ is a forgetting coefficient or factor.

In auto-tuning, a gain of the speed controller 1 is determined based on the estimated inertia $J_n$ so that the motor may operate stably even if the inertia fluctuates. When positional control is implemented in addition to the speed control, a gain of the position controller may be determined based on the estimated inertia.

When the estimated inertia gain $K_n$ is calculated by recursive least squares method, disturbances such as attraction of gravity and constant load have smaller effect on the calculation. According to the configuration shown in FIG. 4, since an error $e_n$ is detected using differences in torque command signals and acceleration feedback signals, an inertia may be estimated using a high gain $K_n$ at the time that acceleration is started or the acceleration speed is changed or acceleration is completed, or at the time that deceleration is started or completed. However, when a cogging torque of the motor is large or vibration is caused in the mechanical system of the load, this vibration may also appear in the acceleration feedback signal. If the cycle in which such vibration appears is close to the sampling frequency of the inertia estimator, the estimating portion of the inertia estimator is affected by the vibration, thereby estimating an inertia at a different value from the one which should be calculated under normal circumstances.

SUMMARY OF THE INVENTION

The present invention aims at improvements of the forgoing disadvantages. Accordingly, an object of the present invention is to provide a method of estimating load inertia for a motor, by which a highly accurate value for load inertia can be estimated even when a cogging torque of the motor is large or resonance or the like occurs in the mechanical system of the load.

In a method of estimating load inertia for a motor according to the present invention, an inertia is estimated as follows:

First, calculating an acceleration feedback difference $\Delta a_n$ is calculated between a value for an acceleration feedback signal which has passed through a filter and a value for a previous acceleration feedback signal which has passed through the filter. A previous estimated inertia $J_{n-1}$ is multiplied by the acceleration feedback difference $\Delta a_n$ to obtain a value of $\Delta a_n J_{n-1}$. Then, a torque feedback difference $\Delta T_n$ is obtained from the value of $\Delta a_n J_{n-1}$. Next, a torque command difference $\Delta T_{cn}$ is calculated between a value for a torque command signal which has passed through another filter and a value for a previous torque command signal which has passed through the another filter. An error $e_n$ is calculated between the torque feedback difference $\Delta T_n$ and the torque command difference $\Delta T_{cn}$. The error $e_n$ is multiplied by an estimated inertia gain $K_n$ to obtain a value of $e_n K_n$. Then, an estimated inertia $J_n$ is obtained by adding the value of $e_n K_n$ to the previous estimated inertia value $J_{n-1}$.

Alternatively, the previous estimated inertia $J_{n-1}$ may be multiplied by a value $\Delta b$ for an acceleration feedback signal which has passed through a high-pass filter to obtain a value of $\Delta b J_{n-1}$; the torque feedback difference $\Delta T_n$ is obtained from the value of $\Delta b J_{n-1}$; and the error $e_n$ may be calculated between the torque feedback difference $\Delta T_n$ and the value $\Delta T b$ for a torque command signal which has passed through the high-pass filer.

In the present invention, vibration in the acceleration feedback signal is detected. The estimated inertia gain $K_n$ is multiplied by a coefficient α of zero (0) or more but less than one (1) when the vibration is equal to or more than a predetermined level. The estimated inertia gain $K_n$ is multiplied by a coefficient α of one (1) when the vibration is less than the predetermined level With this arrangement, it is possible to detect vibration which is caused when cogging torque of the motor is large or resonance occurs in the mechanical system of the load. While the detected vibration is equal to or more than a predetermined level, the estimated inertia gain $K_n$ is multiplied by a coefficient α which lessens the estimated inertial gain $K_n$, thereby reducing the effect by vibration components. To make the effect the least, a coefficient a of zero (0) is used and the estimated inertia $J_n$ is accordingly the same as the previous estimated inertia $J_{n-1}$. Which value within a range of zero (0) or more but less than one (1) should be set to the coefficient α may be determined by testing. When the vibration is not so large, the coefficient α will be one (1), in which case the inertia is estimated in the same manner as has conventionally been done.

Preferably, the estimated inertia gain $K_n$ may be determined by recursive least squares or fixed trace method as has conventionally been done.

The vibration in the acceleration feedback signal is detected as follows:

First, n (n is an integer) sampled values for the acceleration feedback difference $\Delta a_n$ are respectively changed into absolute values and then are passed through an n-time moving-average filter to obtain a first moving-average value. Also, the n sampled values for the acceleration feedback difference $\Delta a_n$ are passed through another n-time moving-average filter to obtain a second moving-average value which is then changed into an absolute value. Next, a difference is calculated between the first moving-average value and the absolute value for the second moving-average value. Then, whether or not the vibration in the acceleration feedback signal exceeds the predetermined level is determined depending upon whether or not the difference thus obtained exceeds a threshold. The level of vibration is thus detected.

The value n for the sampling time may arbitrarily be determined depending upon the circumstances. It is preferred to obtain n sampled values through sampling done by the inertia estimator. Generally, n may be an integer of 2 to 32.

According to the present invention, while the vibration appearing in the acceleration feedback signal is equal to or more than a predetermined level, the estimated inertia gain $K_n$ is multiplied by a coefficient a which lessens the estimated inertial gain $K_n$, thereby reducing the effect upon the inertia estimation and increasing the accuracy of the inertia estimation. Therefore, when a cogging torque of the motor is large, or when resonance or the like occurs in the mechanical system of the load, the estimated inertia is hardly affected by the vibration. As a result, an inertia can be estimated more stably than ever. An auto-tuning device which employs such estimated inertia can be operated much more stably than ever.

DETAILED DESCRIPTION OF PREFERRED EMBODIMENTS

Figure 1:
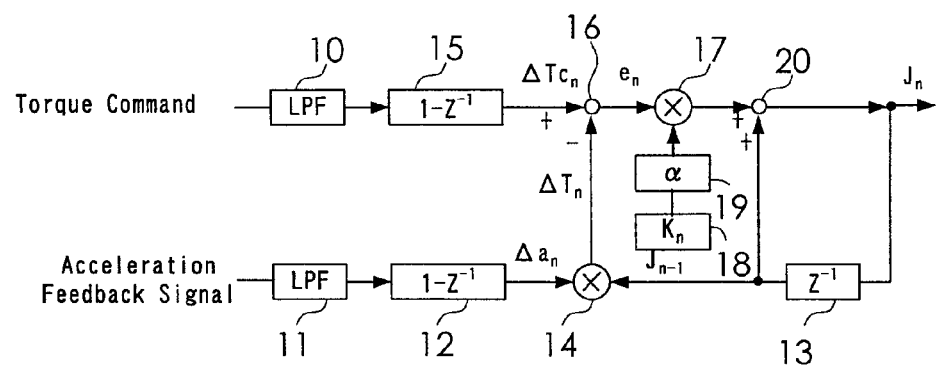
FIG. 1 is a schematic diagram illustrating an embodiment of an inertia estimator which implements a method of estimating load inertia for a motor according to the present invention.

FIG. 1 is a schematic diagram illustrating an embodiment of an inertia estimator which implements a method of estimating load inertia for a motor according to the present invention. In this embodiment, Difference calculation means 12 for calculating an acceleration feedback difference calculates an acceleration feedback difference $\Delta a_n$ between a value for an acceleration feedback signal which has passed through a low-pass filter 11 and a value $(1-Z^{-1})$ for a previous acceleration feedback signal which has passed through the low-pass filter 11. Then, multiplication means 14 multiplies a previous estimated inertia $J_{n-1}$ by the acceleration feedback difference $\Delta a_n$ to obtain a value of $\Delta a_n J_{n-1}$. A torque feedback difference $\Delta T_n$ is obtained from the value of $\Delta a_n J_{n-1}$. The previous estimated inertia $J_{n-1}$ is stored in gain estimation means 13.

Difference calculation means 15 for calculating a torque feedback difference calculates a torque command difference $\Delta T_{cn}$ between a value for a torque command signal which has passed through a low-pass filter 10 and a value for a previous torque command signal which has passed through the low-pass filter 10. Subtraction means 16 calculates an error $e_n$ between the torque feedback difference $\Delta T_n$ and the torque command difference $\Delta T_{cn}$, as expressed in $e_n = \Delta T_{cn} - \Delta T_n$. Multiplication means 17 multiplies the error $e_n$ by an estimated inertia gain $K_n$, which has been multiplied by a coefficient α, to output a value of $e_n \alpha K_n$. Gain estimation means 18 determines the estimated inertia gain $K_n$ by recursive least squares method as has conventionally been done, as expressed in the following expression.

$$K_n = (P_{n-1} \Delta a_n)/(\lambda + P_{n-1} \Delta a_n^2)$$

where $P_n$ is a correlation of coefficient error as expressed in $P_n = P_{n-1}/(\lambda + P_{n-1} \Delta a_n^2)$ and $\lambda$ is a forgetting coefficient or factor.

Coefficient determination means 19, which multiplies the estimated inertia gain $K_n$ by the coefficient α to output the result, has a function of detecting vibration in the acceleration feedback signal. The coefficient determination means 19 multiplies the estimated inertia gain $K_n$ by the coefficient α of zero (0) or more but less than one (1) when the vibration is equal to or more than a predetermined level in a vibration duration, or multiplies the estimated inertia gain $K_n$ by the coefficient a of one (1) when the vibration is less than the predetermined level.

Addition means 20 obtains an estimated inertia $J_n$ by adding the value of $e_n \alpha K_n$ outputted from the multiplication means 17 to the previous estimated inertia value $J_{n-1}$. Inertia estimation is recursively implemented in a predetermined sampling interval while the motor is being controlled. The inertia $J_n$ is estimated so that the error $e_n$ may be smaller.

Figure 2:
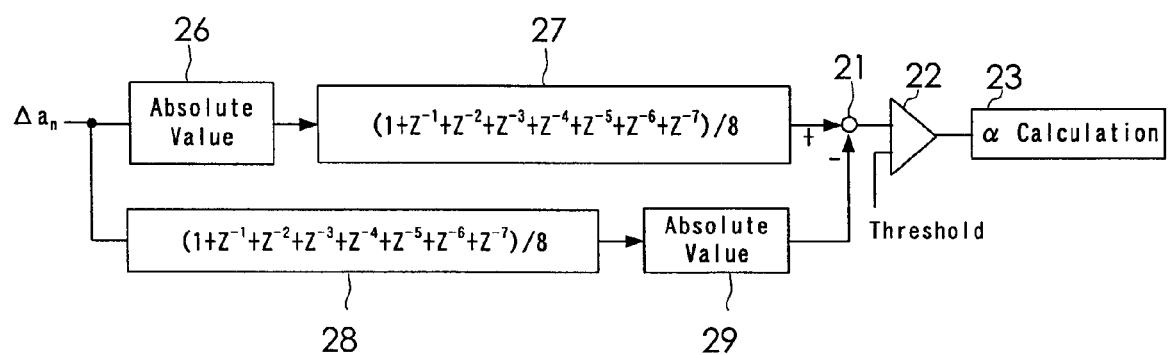
FIG. 2 is a schematic diagram illustrating one example of coefficient determination means for determining a coefficient.

FIG. 2 is a schematic diagram illustrating one example of the coefficient determination means 19. In this example, n (n is an integer) sampled values for the acceleration feedback difference $\Delta a_n$ are respectively changed into absolute values by absolutization means 26. The absolute values thus obtained are passed through an n-time moving-average filter 27 to obtain a first moving-average value. Herein, an acceleration feedback difference refers to a difference between a value for a previous acceleration feedback signal which has passed through a low-pass filter and a value for an acceleration feedback signal which has passed through the low-pass filter. In this example, n sampled values for the acceleration feedback difference $\Delta a_n$ are passed through another n-time moving-average filter 28 to obtain a second moving-average value. Then the second moving-average value is changed into an absolute value by absolutization means 29.

AS shown in FIG. 2, subtraction means 21 calculates a difference between the first moving-average value and the absolute value for the second moving-average value. A comparator 22 compares the difference thus calculated with a threshold. It is determined whether or not the vibration in the acceleration feedback signal exceeds the predetermined level, depending upon whether or not the difference thus obtained exceeds a threshold. If the difference is equal to or more than the threshold, the vibration is equal to or more than the predetermined level. If the difference is less than the threshold, the vibration is less than the predetermined level. Coefficient calculation means 23 determines a value for the coefficient a according to an output from the comparator 22.

Specifically, $\alpha$=G1 (0<=G1<1) when the difference is equal to or more than the threshold, and $\alpha$=1 when the difference is less than the threshold. Thus, the vibration can be detected. When such vibration is detected, an inertia can be estimated with a smaller value for the gain $K_n$ of the inertia estimator. Thus, the vibration effect upon the inertia estimation can be suppressed. Especially if a cogging torque of the motor is large, the estimated inertia is likely to fluctuate, being affected by the vibration, when the motor is going to stop. According to the present invention, when the motor starts to vibrate due to the cogging torque, the vibration appearing in the acceleration feedback signal can be detected and the estimated inertia gain is lessened, thereby alleviating the effect. When the mechanical system of the load is not rigid and is vibrating, the vibration appearing in the acceleration feedback signal can be detected and the estimated inertia gain is lessened, thereby alleviating the effect.

Figure 3:
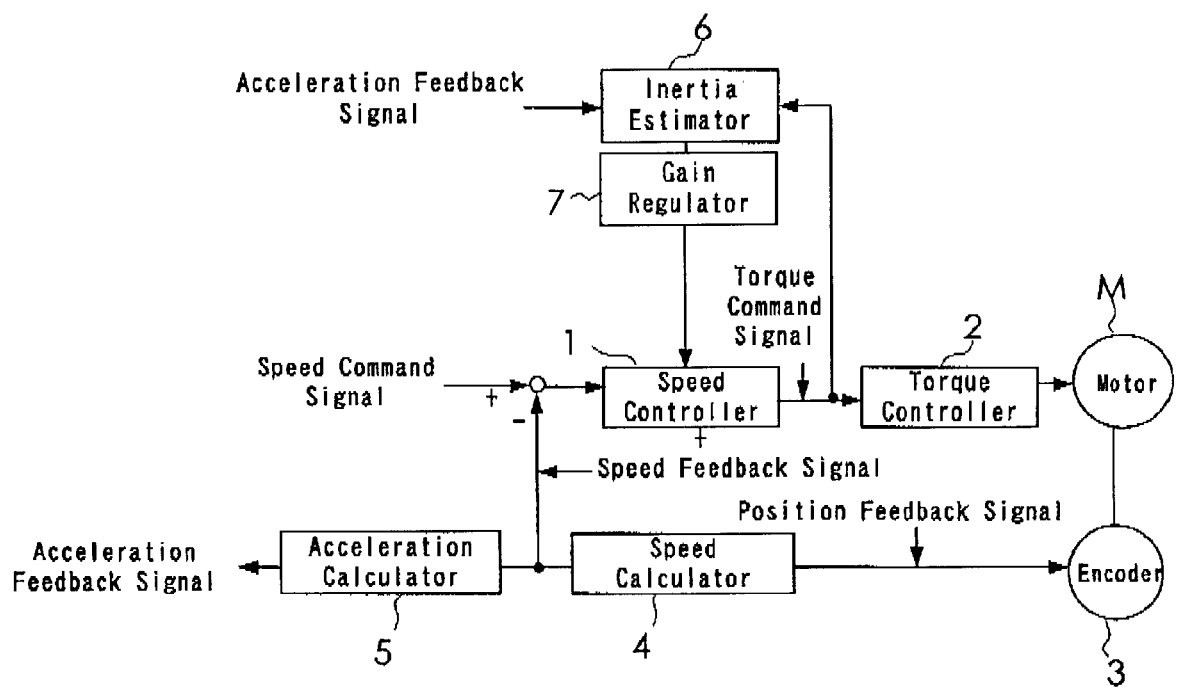
FIG. 3 is a schematic diagram illustrating a conventional motor speed controller which implements auto-tuning using an estimated load inertia.
Figure 4:
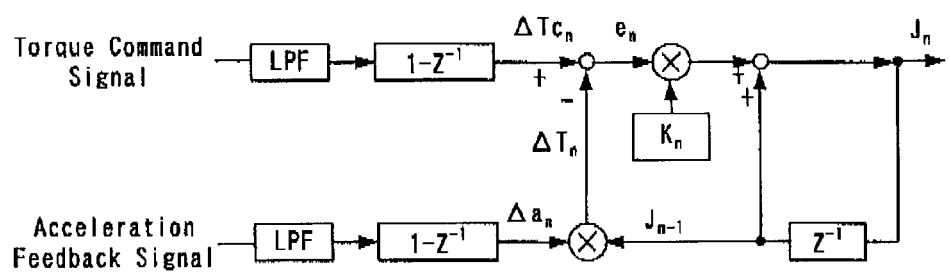
FIG. 4 is a schematic diagram illustrating a configuration of the conventional inertia estimator of FIG. 3.
Figure 5:
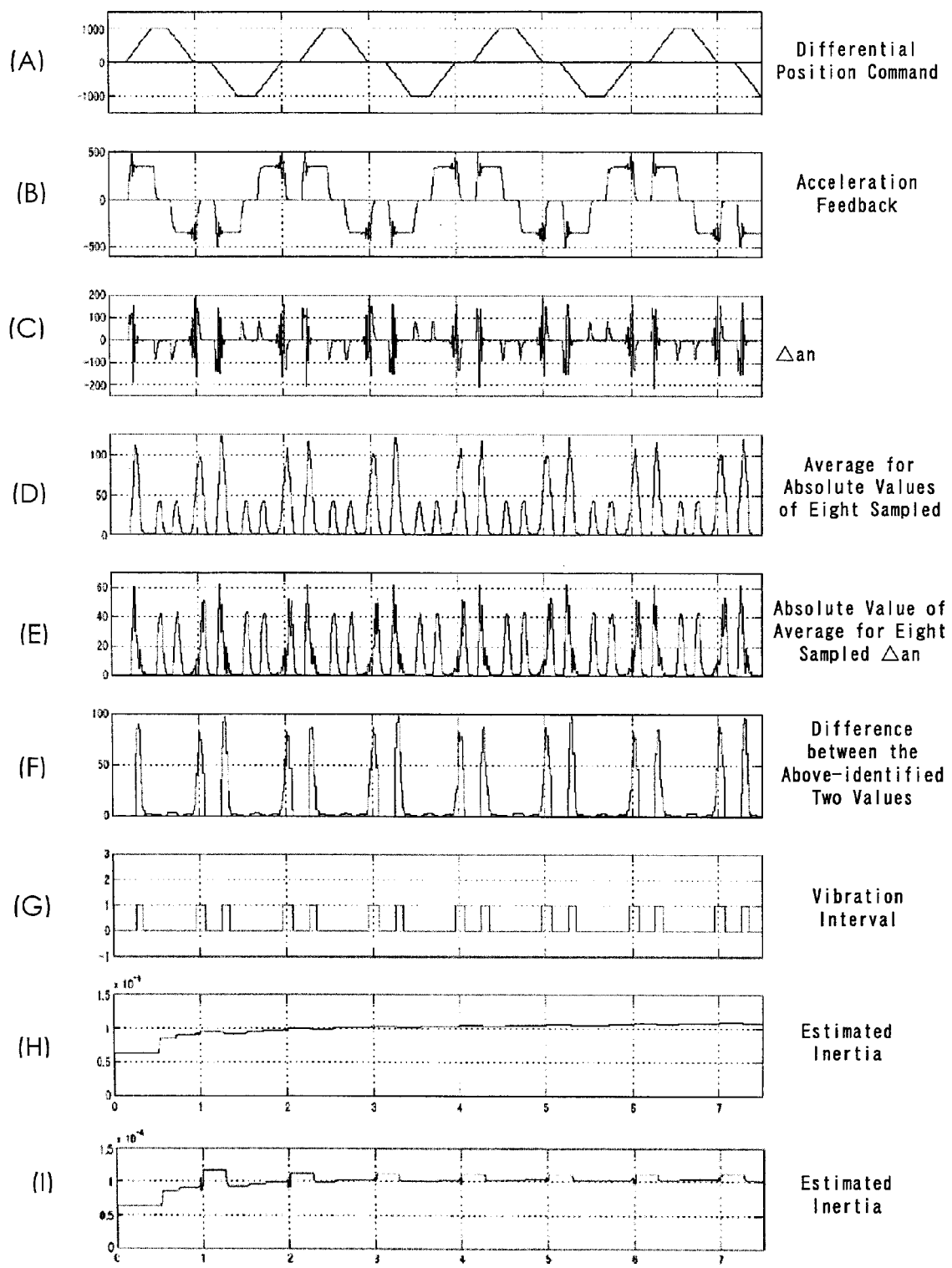
FIGS. 5A thorough 5I are waveform diagrams illustrating simulated inertia estimation when the inertia estimator of FIG. 1 is applied to the motor speed controller of FIG. 3 and a motor having large cogging torque is driven.

The average time of moving average filtering is set to 2 to 32 in order to detect vibration in the acceleration feedback signal that is large enough to badly affect the inertia estimation. The threshold may be predetermined by testing. Generally, a value of approximately 10 rad/sec$^2$ is employed for the threshold. FIGS. 5A thorough 5I illustrate simulated inertia estimation when the inertia estimator of FIG. 1 is applied to the motor speed controller of FIG. 3 and a motor having large cogging torque is driven. FIG. 5A illustrates a differential position command to be inputted into the motor controller. FIG. 5B illustrates an acceleration feedback signal. As known from FIG. 5B, vibration due to the cogging torque (vibration component) appears at the time that acceleration is started or deceleration is completed. FIG. 5C illustrates an acceleration feedback difference $\Delta a_n$ between a value for an acceleration feedback signal which has passed through a low-pass filter 11 and a value (1−Z$^{-1}$) for a previous acceleration feedback signal which has passed through the low-pass filter 11. The waveform significantly appearing in FIG. 5C is the vibration component. FIG. 5D illustrates an 8-time moving-average of absolute values for sampled differences $\Delta a_n$. FIG. 5E illustrates an absolute value for the 8-time moving-average of sampled differences $\Delta a_n$. FIG. 5F illustrates a difference between the value of FIG. 5D and the value of FIG. 5E. FIG. 5G illustrates the difference which is compared with the threshold by the comparator 22. Therefore, FIG. 5G indicates a vibration interval in which the vibration is being continued. FIG. 5H illustrates the estimated inertia when the estimated inertia gain $K_n$ is lessened since the coefficient $\alpha$ is zero (0) or more but less than one (1) in the vibration interval. For comparison, FIG. 5I illustrates the estimated inertia when the coefficient $\alpha$ is set to one (1) as has conventionally been done. When FIGS. 5H and 5I are compared, it is clear that, according to the present invention, the estimated inertia is substantially not affected by the effect of vibration appearing in the acceleration feedback signal. In contrast therewith, according to the conventional inertia estimation methods, the estimated inertia fluctuates, being affected by the vibration caused due to cogging torque and appearing in the acceleration feedback signal at the time that acceleration is started or deceleration is completed.

In this embodiment of the present invention, a threshold is used to determine how big the vibration is. The coefficient $\alpha$ may be calculated according to how big vibration is.

Figure 6:
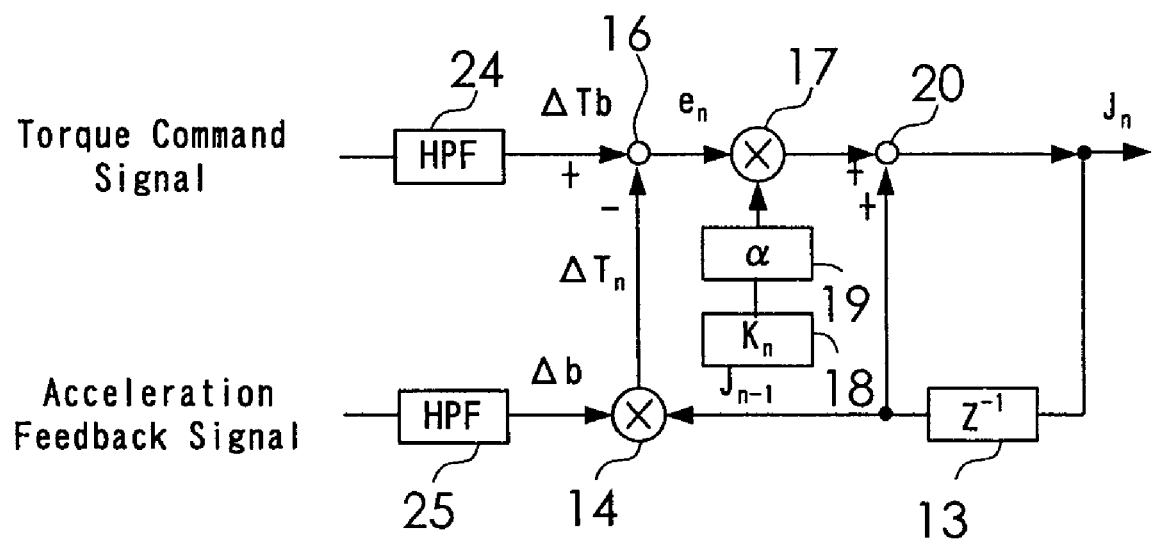
FIG. 6 is a schematic diagram illustrating another embodiment of the inertia estimator which implements the method of estimating load inertia for a motor according to the present invention.

As shown in FIG. 6, the error $e_n$ may be calculated by using a high-pass filters 24 and 25 instead of the low-pass filters 10 and 11 to process the acceleration feedback signal and torque command signal to obtain values $\Delta b$ and $\Delta Tb$ which correspond to the differences $\Delta a_n$ and $\Delta T_{cn}$ shown in FIG. 1. In this case, the process after obtaining the error is the same as the one shown in FIG. 1. and the description is omitted.

Further, the present invention is not limited to these embodiments, but various variations and modifications may be made without departing from the scope of the present invention.

What is claimed is:

1. A method of estimating load inertia for a motor comprising the steps of:

calculating an acceleration feedback difference $\Delta a_n$ between a value for an acceleration feedback signal which has passed through a low-pass filter and a value for a previous acceleration feedback signal which has passed through the low-pass filter, multiplying a previous estimated inertia $J_{n-1}$ by the acceleration feedback difference $\Delta a_n$ to obtain a value of $\Delta a_n J_{n-1}$, obtaining a torque feedback difference $\Delta T_n$ from the value of $\Delta a_n J_{n-1}$, calculating a torque command difference $\Delta T_{cn}$ between a value for a torque command signal which has passed through another low-pass filter and a value for a previous torque command signal which has passed through the another low-pass filter, calculating an error $e_n$ between the torque feedback difference $\Delta T_n$ and the torque command difference $\Delta T_{cn}$, multiplying the error $e_n$ by an estimated inertia gain $K_n$ to obtain a value of $e_n K_n$, and obtaining an estimated inertia $J_n$, by adding the value of $e_n K_n$ to the previous estimated inertia value $J_{n-1}$, wherein the estimated inertia gain $K_n$ is multiplied by a coefficient $\alpha$, wherein when vibration in the acceleration feedback signal is equal to or more than a predetermined level, said coefficient α has a value greater than 0 but less than 1, and, wherein when the vibration in the acceleration feedback signal is less than the predetermined level, said coefficient α has a value of 1.

2. The method of estimating load inertia for a motor according to claim 1, wherein the estimated inertia gain $K_n$ is determined by recursive least squares or fixed trace method.

3. The method of estimating load inertia for a motor according to claim 1, wherein n (n is an integer) sampled values for the acceleration feedback difference $\Delta a_n$ are respectively changed into absolute values and then are passed through n-time moving-average low-pass filter to obtain a first moving-average value; the n sampled values for the acceleration feedback difference $\Delta a_n$ are passed through another n-time moving-average low-pass filter to obtain a second moving-average value; and then the second moving-average value is changed into an absolute value; a difference is calculated between the first moving-average value and the absolute value for the second moving-average value; and whether or not the vibration in the acceleration feedback signal exceeds the predetermined level is determined depending upon whether or not the difference thus obtained exceeds a threshold.

4. The method of estimating load inertia for a motor according to claim 3, wherein n is an integer of 2 to 32.

5. A method of estimating load inertia for a motor comprising the steps of:

multiplying a previous estimated inertia $J_{n-1}$ by an acceleration feedback signal which has passed through a high-pass filter $\Delta b$ to obtain a value of $\Delta b J_{n-1}$, obtaining a torque feedback difference $\Delta T_n$ from the value of $\Delta b J_{n-1}$, calculating an error $e_n$ between the torque feedback difference $\Delta T_n$ and a value $\Delta Tb$ for a torque command signal which has passed through another high-pass filter, multiplying the error $e_n$ by an estimated inertia gain $K_n$ to obtain a value of $e_n K_n$, and obtaining an estimated inertia $J_n$ by adding the value of $e_n K_n$ to the previous estimated inertia value $J_{n-1}$, wherein the estimated inertia gain $K_n$ is multiplied by a coefficient α, wherein when vibration in the acceleration feedback signal is equal to or more than a predetermined level, said coefficient α has a value greater than 0 but less than 1, and wherein when the vibration in the acceleration feedback signal is less than the predetermined level, said coefficient α has a value of 1.

6. The method of estimating load inertia for a motor according to claim 5, wherein the estimated inertia gain $K_n$ is determined by recursive least squares of fixed or trace method.

* * * * *